Mar. 6, 1923.

J. C. CHAPMAN.
SILENT CHAIN SPROCKET.
FILED MAR. 30, 1922.

1,447,644.

Inventor
John Curry Chapman
W. Clay Lindsey
His Attorney

Patented Mar. 6, 1923.

1,447,644

UNITED STATES PATENT OFFICE.

JOHN CURRY CHAPMAN, OF HARTFORD, CONNECTICUT, ASSIGNOR TO THE WHITNEY MANUFACTURING COMPANY, OF HARTFORD, CONNECTICUT, A CORPORATION OF CONNECTICUT.

SILENT CHAIN SPROCKET.

Application filed March 30, 1922. Serial No. 548,246.

*To all whom it may concern:*

Be it known that I, JOHN CURRY CHAPMAN, a citizen of the United States, and resident of Hartford, county of Hartford, State of Connecticut, have invented certain new and useful Improvements in a Silent Chain Sprocket, of which the following is a specification.

This invention relates, generally, to sprocket wheels for use in connection with power chains, and particularly power chains of that type comprising a plurality of pivotally connected links formed of link plates with teeth at each end adapted to cooperate with the teeth of the sprocket over which the chain passes. One objection to chains of this type is that when in operation they make a disagreeable noise caused by the teeth of the links coming into engagement in very rapid succession with the teeth of the drive sprocket. The aim of the present invention is to provide an improved sprocket which will very materially reduce the noise of the chain as it passes thereover.

Figure 1:
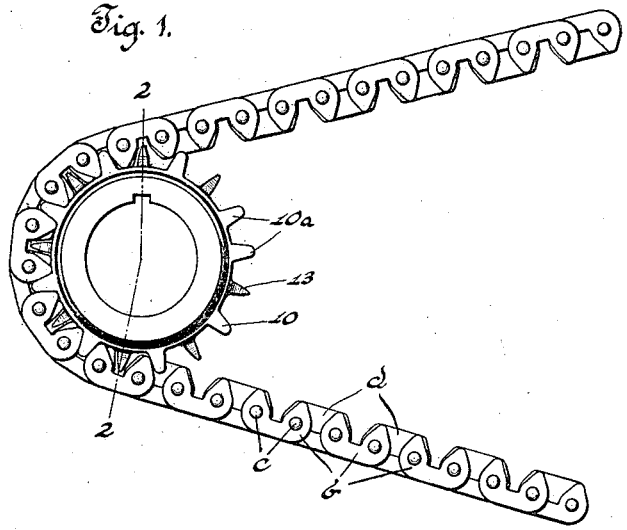
Figure 2:
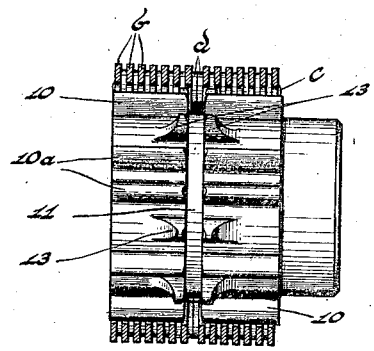
Figure 3:
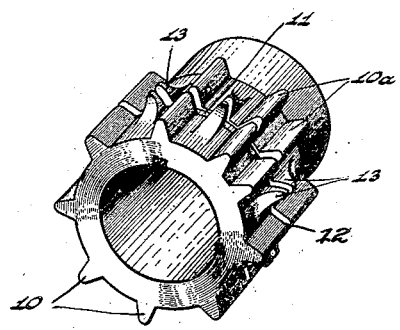

In the accompanying drawing, wherein I have shown for illustrative purposes one form which the invention may take, Fig. 1 is an end view of my improved sprocket with a link chain passing thereover;

Fig. 2 is a side view of the sprocket with the chain in section along line 2—2 of Fig. 1, and Fig. 3 is a perspective view of the sprocket.

Referring to the drawing in detail, I have shown in Figs. 1 and 2 a chain of the well known type having links formed of link plates $b$, the plates of the several links being connected together by suitable pivot members, such as pins $c$. Each of the plates $b$ are provided at each end with a tooth adapted to cooperate with the teeth of the sprocket wheel as shown. In some instances, it is found to be of advantage to provide along the center of the chain guide plates $d$ which are adapted to take into a circumferential groove in the sprocket so as to prevent the chain from slipping off. The pitch of the chain may be taken to be the distance from center to center of adjacent pivots $c$.

In accordance with the present invention, I provide a sprocket wherein some of the sprocket teeth are omitted, in the present instance every other tooth being eliminated, thus providing a sprocket having its teeth 10 spaced apart a distance which is twice the pitch of the chain. With this arrangement, it will be seen that when the sprocket is driving the chain, the number of engagements between the teeth of the links and the teeth of the sprocket will be substantially one-half of what they would be if the sprocket were provided with teeth spaced apart in accordance with the pitch of the chain; that is to say, the number of clicks or tappings caused by the chain links engaging against the sprocket teeth is reduced by fifty per cent, and thus the noise resulting from this clicking or tapping is substantially cut in two. It is found to be of advantage to have an odd number of teeth on the sprocket with two of the teeth, such as the teeth $10^a$, spaced apart in accordance with the pitch of the chain. The reason for this is that with an odd number of teeth the wear is more evenly distributed on the sprocket and the chain teeth, and the monotony of the noise caused by the chain teeth coming into engagement with the sprocket teeth is interrupted.

While, as a matter of fact, the noise, caused by the chain passing over a sprocket having an odd number of teeth with two of the teeth spaced apart in accordance with the pitch of the chain, is very slightly greater than would be the case if the sprocket were provided with an even number of teeth with all of the teeth regularly spaced apart at a distance twice the pitch of the chain, the noise actually sounds less loud, this being due to the psychological effect resulting from breaking up the regularity with which the chain teeth engage the sprocket teeth. Where the chain is provided along its central line with the guide plates $d$, the sprocket may have a circumferential groove 11 to receive these plates, and this groove extends through the sprocket teeth as at 12. I have found that where the teeth are spaced apart twice the distance of the pitch of the chain, there is a likelihood, unless means are provided to prevent it, of the chain becoming displaced axially of the sprocket. To prevent this, I provide, half way between the teeth, a pair of lugs 13 one to each side of the groove 11, and these lugs are of less width than the sprocket teeth so that the teeth of the chain do not engage against the lugs. If desired, the lugs may be relatively short, as shown. In one manner of speaking, each pair of lugs is a single lug centrally slotted so as to form in part the groove 11. With the arrangement described, it will be understood that the teeth of the chain only engage the teeth of the sprocket and not the lugs 13, and owing to the spacing of the sprocket teeth, the noise, resulting from the chain passing over the sprocket, is very materially reduced.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:—

1. A sprocket for use in connection with a chain of the character described having some of its teeth spaced apart a distance at least twice the pitch of the chain and other adjacent teeth spaced apart at a different distance.

2. A sprocket for use in connection with a chain of the character described having an uneven number of teeth all but two of which are spaced apart twice the pitch of the chain, and said two teeth being spaced apart a distance equal to the pitch of the chain.

3. A sprocket for use in connection with a chain of the character described having teeth spaced apart at least twice the distance of the pitch of the chain, a lug positioned between and of less width than said teeth, and a circumferential groove extending through said teeth and lugs for the reception of the guide plates of the chain.

JOHN CURRY CHAPMAN.